May 23, 1950 W. C. MILLER 2,508,764
OPTICAL PROJECTION SYSTEM
Filed May 22, 1945 2 Sheets-Sheet 1
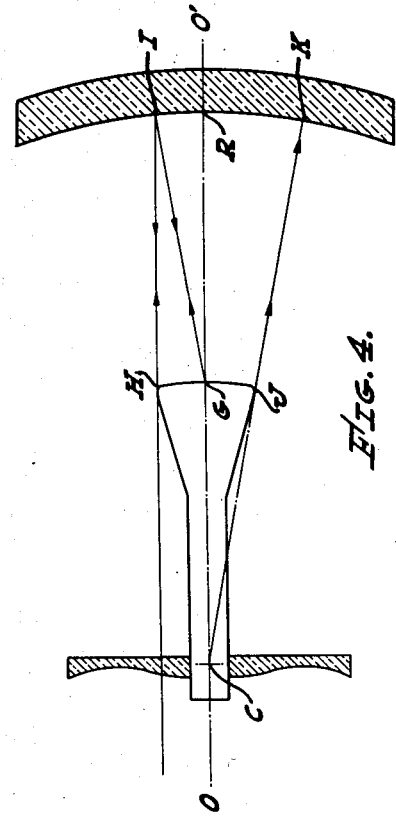
Fig. 4.
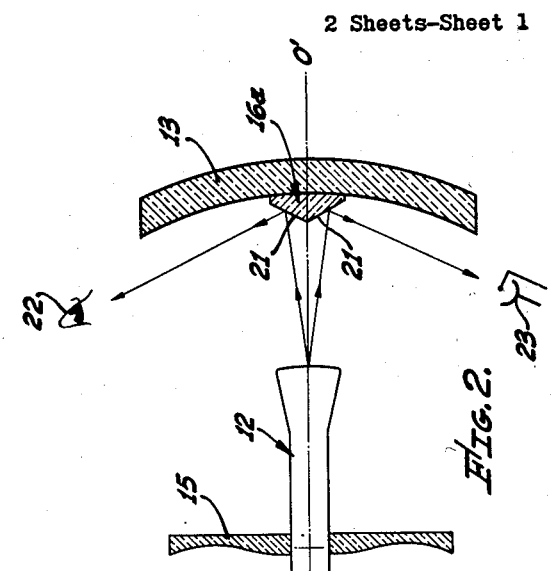
Fig. 2.
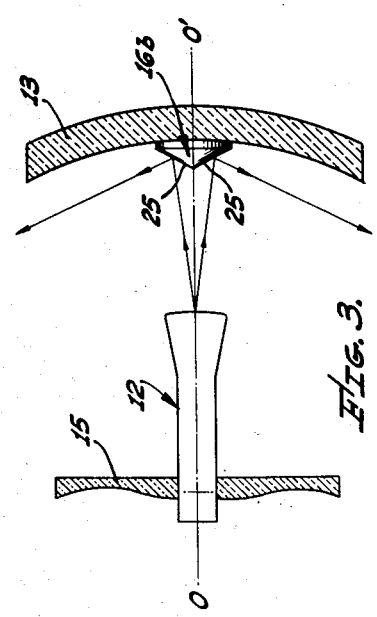
Fig. 3.
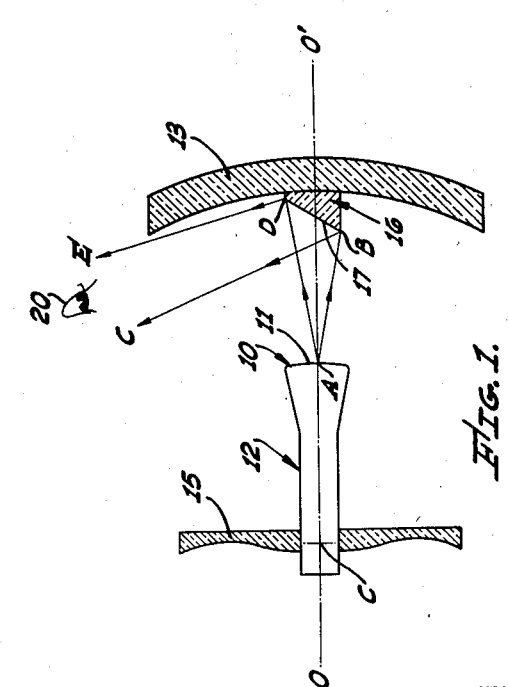
Fig. 1.
INVENTOR.
WILLIAM C. MILLER,
BY
ATTORNEY.

May 23, 1950 W. C. MILLER 2,508,764
OPTICAL PROJECTION SYSTEM
Filed May 22, 1945 2 Sheets-Sheet 2

INVENTOR.
WILLIAM C. MILLER,
BY
ATTORNEY

Patented May 23, 1950

2,508,764

UNITED STATES PATENT OFFICE 2,508,764

OPTICAL PROJECTION SYSTEM

William C. Miller, Pasadena, Calif.

Application May 22, 1945, Serial No. 595,102

9 Claims. (Cl. 88—24)

This invention relates generally to optical projection systems involving the use of a mirror to project an image of a source, which latter may be a television or radar image on a cathode ray tube, or an illuminated motion picture film frame, as a further example, onto an enlarged viewing screen.

The projection of television and radar images onto a screen of suitable size requires optical projection systems of great optical speed and high correction. Only two such systems are known at present. One involves the Schmidt telescope principle adapted to the projection problem. It comprises a spherical mirror with a correcting plate located at its center of curvature to eliminate spherical aberration. The other is a spherical mirror with a strongly meniscus lens located at some distance from the center of curvature of the mirror. In such systems the correcting plate or meniscus lens is perforated with a hole through which the cathode ray tube providing the image to be projected is inserted. The fluorescent surface of the tube is positioned at the focal plane of the projection system.

Light radiating from the fluorescent surface falls on the mirror and is reflected through the correcting plate or the meniscus lens to a focus on the screen. Some of the light from the fluorescent cathode surface falls on the area of the mirror directly in front of the tube and is reflected back onto the image surface of the tube. This reflected light detracts from the contrast of the image being projected and confuses the details of the picture. It is known that it is necessary to prevent this light from falling back on the tube face if satisfactory performance is to be obtained.

Edward G. Ramberg, in Patent No. 2,309,788, has disclosed one solution to this problem consisting in covering the central area of the mirror with a non-reflecting material, a metal baffle, or by removing the central portion of the mirror entirely. The light is thus prevented from reaching the tube face and causing trouble. But at the same time the light reaching this non-reflecting area is lost and does not serve any useful purpose.

The general object of the present invention is to provide a novel means for preventing the offending rays from being reflected back to the source, and which at the same time does not require that they necessarily be thrown away, so that they can, if desired, be put to useful purposes.

A further object is the provision of an optical projection system of the character mentioned in which optical and/or electronic means are incorporated for the purpose of utilizing the light rays diverted from the system to actuate monitoring and/or control devices.

In accordance with the present invention, I provide, forwardly of the central portion of the mirror, a reflective optical element arranged to intercept the offending light rays and reflect them off to one side. These rays can be concentrated and advantageously utilized either for visual inspection of the picture being projected, or the light can be directed into auxiliary equipment such as an optical system to produce an image of the fluorescent surface at a location convenient for inspection by a technician employed in the control and monitoring of the cathode image. Or the light can be received on suitable electronic devices for controlling or monitoring the image.

The invention will be more fully understood from the following detailed description of certain typical embodiments, reference being had to the accompanying drawings, in which:

Figure 1 is a diagrammatic view showing one embodiment of the invention;

Figure 2 is a similar view showing a modification;

Figure 3 is a similar view showing still another modification;

Figure 4 is a diagram illustrating the determination of the optimum size of the beam of light which the reflective element should intercept.

Figure 5:
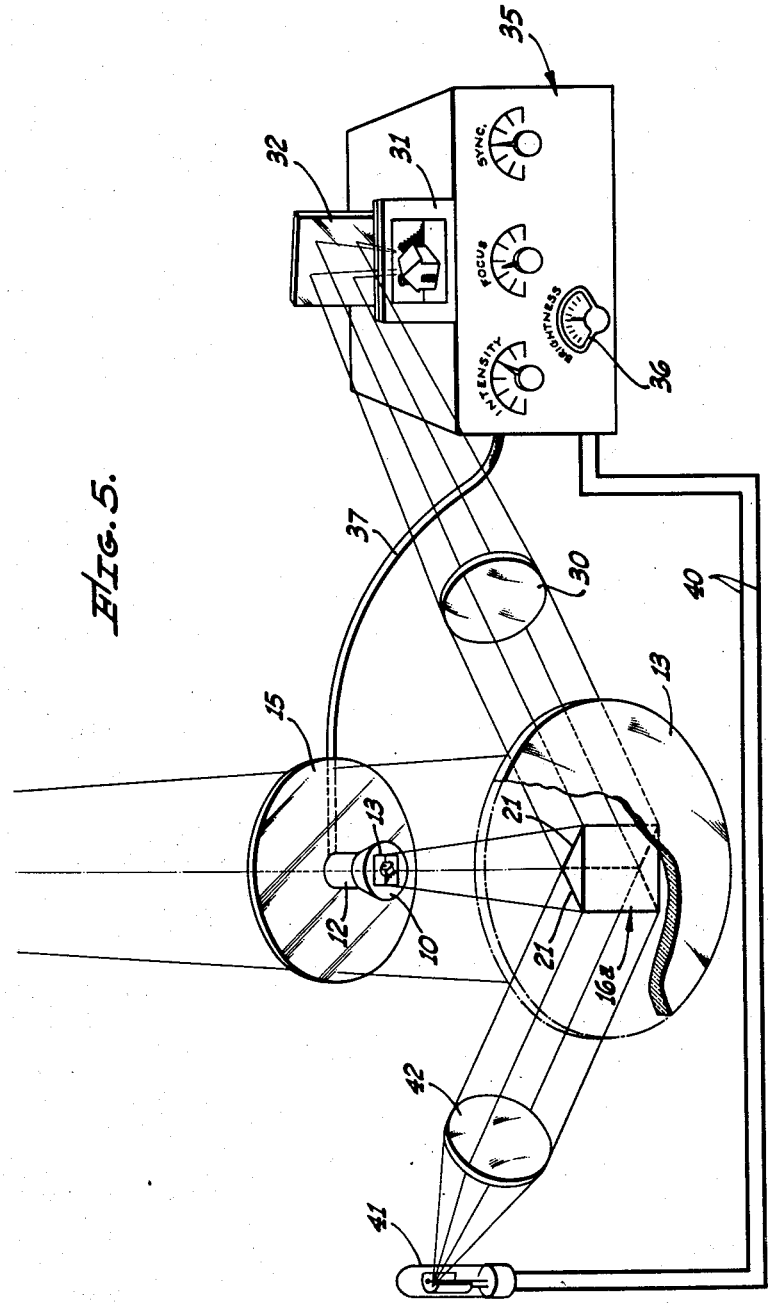
Figure 5 is a diagrammatic view in perspective indicating typical means for utilizing the light rays diverted from the projection system.

Referring now to Fig. 1 of the drawings, I show at 10 the curved fluorescent screen of a cathode ray tube 12 of a television projection system. On the conventionally rectangular image area 11 of this screen is projected a cathode ray tube image, which becomes the "object" of the projection system, and which is representative in a general way of any other suitable "object," which might alternatively, for instance, be an illuminated motion picture image. Facing screen 11 is the usual concave spherical mirror 13, whose center of curvature and that of screen 11 coincide at C on the optic axis O—O' of the system. While the concave mirror 13 is preferably spherical, no limitation thereto is to be implied, as its figuring may of course deviate from spherical. It may be broadly described in any instance as having a concave reflective surface of revolution. Arranged about the base portion of cathode ray tube 12, and centered on axis O—O', is the usual Schmidt correcting plate 15, designed to correct for spherical aberration in the image on the usual projection screen, not illustrated. The system as so far described is of a known type and its components need not further be described.

Positioned immediately before the center portion of mirror 13 is a reflective element 16, of an area, selected in a manner later to be discussed, such as to intercept a substantial or major proportion of the light rays which otherwise would be reflected back to cathode ray screen 11. The reflective element 16 is preferably, though not necessarily, mounted on the mirror itself, as by being cemented thereto, mounted in a frame work, or set into a socket or hole in the mirror. The present drawings being diagrammatic in nature, and such mounting arrangements being well within the skill of those skilled in the art, no illustration of particular mounting arrangements has been deemed necessary. This element 16 in this instance has a single reflecting face 17 disposed diagonally to axis O—O' in a manner to reflect the intercepted light rays from screen 11 off to one side, between the mirror and the cathode ray tube. Thus rays originating at the center of the screen are reflected as indicated by the light cone ABC, ADE. Since the tip of the diagonal reflector 16 stands farther from the mirror than does the other edge, it would obstruct more light than the other edge if the reflector were centrally located on axis O—O'. This has been overcome by offsetting the reflector slightly with respect to axis O—O', to such an extent that the shadow cast by the tip of the reflector falls equidistant from the center of the mirror as that cast by its lower edge.

The light thus intercepted and reflected out of the projection system is prevented from reaching the screen of the cathode ray tube and so reducing its contrast. At the same time, this light so reflected out of the system can be used for visual observation of the image on the face of the tube, for monitoring or adjustment purposes, or, in conjunction with suitable optical equipment, can be concentrated to form an image for more convenient observation and monitoring. Moreover, with the use of suitable optical and/or electronic equipment, manual or automatic control, adjustment and monitoring of the projection can be accomplished. Such auxiliary equipment is not further illustrated in Fig. 1, although an eye is indicated at 20, which may be taken as representative of the eye of a human observer, or for which may be substituted any electric eye or photo tube, or a suitable optical and/or electronic system. Simple forms of such systems are indicated in Fig. 5, and will be referred to in more particular hereinafter.

In the modification of Fig. 2, the cathode ray tube 12, mirror 13, and correcting plate 15 may be as in Fig. 1, but a modified reflector element 16a is provided having two preferably, though not necessarily, flat diagonal faces 21 meeting at an apex that intersects at or near axis O—O'. The faces 21 are at such angles as will reflect the intercepted light laterally out of the system between the cathode ray tube and the mirror, as indicated in the figure. The reflective element 16a is thus a beam splitter, and may reflect one bundle of rays to the eye 22 of an observer for visual observation, and another to an electric eye or photo tube 23 which may form a portion of an electronic monitoring, indication, or control system. Fig. 5 illustrates in more detail possible arrangements of such a system.

Fig. 3 shows a similar optical projection system, embodying cathode ray tube 12, mirror 13 and correcting plate 15, wherein a modified reflective element 16b is employed, characterized by a conical reflective face 25 formed at an angle to reflect the light angularly out all around, between the cathode ray tube and the mirror. This simplified form is suitable in those instances in which it is desired to intercept the offending light and reflect it harmlessly out of the system, but in which the reflected light is not to be captured to serve other purposes.

The angular size of the cone of light to be intercepted by the reflective element is important. If it is so large that it includes all of the rays of light which could, under any normal circumstances, be reflected back to the fluorescent surface by the spherical mirror, then considerable useful light will unavoidably be intercepted and the projected image would be needlessly robbed of light. If the intercepted beam of light is so small that the area of the spherical mirror over which it would fall is equal to or less than the size of the image on the face of the fluorescent tube, then light from the outer areas of the fluorescent screen will still be reflected back onto the tube by some of the central unobstructed portions of the spherical mirror. Therefore a compromise must be reached between these two extremes which suits the particular conditions under which the projection system is to be used. Fig. 4 shows the geometry of the two conditions just described. The upper portion of the drawing shows a ray of light originating at the center point G of the fluorescent surface and reflected from the spherical mirror at the point I, which is the point on the mirror surface which is at a distance from the center R equal to the radius of the image surface HGJ, and is the closest point to the center R which will cause the reflected ray to graze the side of the image at H. Therefore if the conical beam of light represented by the triangle GRI rotated about the axis O—O' is intercepted by the reflective element, light from the central part of the fluorescent screen cannot be reflected back onto the tube and impair the image quality. But if one considers the light originating at H at the border of the image and also reflected at I, one sees that it travels the reverse path of the ray first discussed. Therefore light from H will be reflected from the unobstructed portion of the spherical mirror and reach the fluorescent face of the tube. The outer portion of the tube will therefore be protected from reflected light from the center of the fluorescent image but the central portion of the screen will not be protected from light from the outer parts of the fluorescent image. This therefore represents the minimum size of the cone of light which should be intercepted and reflected out to improve the projected image.

The lower half of Fig. 4 shows the other extreme condition, where the beam intercepted by the reflective member is such that no light from any portion of the tube surface falls on the spherical mirror closer to the center R than the point K. The point K is determined by projecting a line from the center of curvature C of the spherical mirror through the point J at the edge of the illuminated image to the mirror. If the reflective member intercepts the light in the cone the radius of whose base is KR, then no light from any part of the fluorescent surface can be reflected back by the spherical mirror onto the tube face JGH.

The closest ray is that from J to the mirror K which is reflected back just to the edge of the screen at J. However, light from the central portion of the fluorescent surface which would have been reflected from the portion of the mirror between I and K to the screen is now lost and the brightness of the projected image is decreased. The ideal condition lies somewhere between that represented by the upper half of the diagram and that represented by the lower half. The exact size of the cone of light to be intercepted can best be determined for each particular case and application of the projection system, depending upon whether light intensity or image contrast is the consideration of more importance. The outline of the reflective surface or surfaces of the reflective element is thus determined accordingly for any given case.

Since the customary shape of the illuminated area of the fluorescent tube is rectangular, an important saving of light can be realized by making the reflective member rectangular in shape also, geometrically similar to the illuminated area, and properly aligned with the picture being projected. Such an arrangement appears in Fig. 5, to which reference will next be directed.

In Fig. 5 I have indicated diagrammatically beneficial uses to which the diverted central bundle of otherwise offending light rays are put in accordance with the present invention. The system here shown will be noted to be similar to that of Fig. 2, having the same cathode ray tube 12, with a rectangular image area 11 on its screen 10, the same correcting plate 15, the same concave mirror 13, and the same beam splitting reflector element 16a, provided with two diagonal reflective faces 21. Fig. 5 nicely illustrates the preferred rectangular base or outline of the reflective element 21, geometrically similar to and aligned with the rectangular image area 11 on the cathode ray tube. It will of course be evident that this rectangular outline may be, and preferably is, used as well with the optical element of Fig. 1. Broadly considered, it is preferred in all forms of my invention that the optical reflector be geometrically similar to the image area of the cathode ray tube and be aligned therewith.

As further indicated in Fig. 5, the light rays diverted and reflected from one face 21 of reflector 16a are intercepted by a lens 30, which brings them to a focus at a monitoring screen 31. In the present instance, a mirror 32 is used to reflect the rays from the rays from the lens 30 toward this screen 31. Thus an auxiliary image is formed on the monitoring screen, and may be observed by the operator, as a guide in making adjustments or handling controls. As here shown, the screen 31 is mounted on top of a cathode ray tube control unit 35 of any suitable design, and here shown as having brightness meter 36, and usual intensity, focus, and synchronizing controls, as indicated. A usual control cable between control unit 35 and cathode ray tube 12 is indicated at 37. It will be evident that the operator can operate these controls with greatly increased convenience and facility by reference to the image on the monitoring screen placed immediately at hand.

The brightness meter 36 is connected by means of a circuit 40 with photo tube 41, onto which a small optical image of the picture on the cathode ray tube screen is cast by lens 42 receiving light reflected out of the system by the other face 21 of reflector 16a. Thus, the operator is provided with an additional check on the brightness or intensity of the projected image, more sensitive and accurate than that provided by the monitoring screen. By reference to the reading of this brightness meter, he can very accurately set the intensity control. The described brightness meter is to be taken as representative of various electronic indication or control devices responsive to the potential developed by the photo tube, which is in turn actuated by light diverted from the projection system. Thus two advantages are gained at once, i. e.; first, improvement of image quality by removal of harmful light; and second, utilization of the otherwise harmful light in indication and/or control equipment. Many variations of and additions to the specific arrangements herein disclosed will occur to those skilled in the art, and are contemplated as coming within the broad scope of the claims appended hereto.

I claim:

1. Means for improving the image cast by a projection system embodying a mirror comprising a concave reflective surface of revolution and an object positioned on the optic axis of said surface in front of the concave face thereof comprising: a reflector positioned between said object and a central inner portion of said mirror formed with a reflective surface disposed diagonal to said optic axis and obliquely facing said object so as to intercept a central inner bundle of the light rays traveling from said object toward said mirror and to reflect such intercepted rays laterally out of the system prior to reaching said mirror, said diagonal reflective face being of a size to intercept only a central bundle of light rays which would otherwise strike a central inner area of said mirror substantially at least as great as that of the object.

2. In an image projecting system, the combination comprising a projection mirror consisting of a concave reflective surface of revolution and a reflective element mounted adjacent and covering an inner central portion of said mirror, said reflective element being formed with a reflective surface positioned diagonal to the optic axis of said mirror and obliquely facing said object so as to intercept and reflect rays traveling from an object on said axis toward said central inner portion of said mirror laterally out of the system prior to reaching said mirror, said diagonal reflective face being of a size to intercept only a central bundle of light rays which would otherwise strike a central inner area of said mirror substantially at least as great as that of the object.

3. In a projection system for projecting an image of an object onto a screen, the combination of a mirror comprising a concave reflective surface of revolution positioned to face said object and arranged with its optic axis through said object, and a reflector positioned between said object and a central inner portion of said mirror formed with a pair of oppositely inclined reflective surfaces oriented to face said object and to lie diagonal to and to meet at an apex near said optic axis, said faces being adapted to intercept a central inner bundle of the light rays traveling from said object toward said mirror and to split said bundle of rays into two beams and reflect same laterally out of the system prior to reaching said mirror, said reflector being of a size to intercept only a central bundle of light rays which would otherwise strike a central area of said mirror substantially at least as great as that of the object.

4. In a projection system for projecting an image of an object onto a screen, the combination of a mirror comprising a concave surface of revolution positioned to face said object and arranged with its optic axis through said object, and a reflector positioned between said object and a central inner portion of said mirror formed with a substantially conical reflecting surface facing said object so as to intercept a central inner bundle of the light rays traveling from said object toward said mirror and to reflect said rays laterally out of the system prior to reaching said mirror, said reflective face being of a size to intercept only a central bundle of light rays which would otherwise strike a central area of said mirror substantially at least as great as that of the object.

5. In a projection system for projecting an image of an object onto a projection screen, the combination of an image projecting mirror comprising a concave reflective surface of revolution positioned to face said object and arranged with its optic axis through said object, a reflector positioned between said object and a central inner portion of said mirror formed with a reflective surface diagonal to said optic axis and obliquely facing said object so as to intercept a central inner bundle of the light rays traveling from said object toward said mirror and to reflect said intercepted rays laterally out of the system in a beam directed between said object and said mirror, said reflector being of a size to intercept only a central inner bundle of light rays which would otherwise strike a central area of said mirror substantially at least as great as that of the object, and optical means in the path of said reflected beam for forming an auxiliary image of said object.

6. In a projection system for projecting an image of an image area onto a projection screen, the combination of a concave mirror comprising a reflective surface of revolution positioned to face said image area and arranged with its optic axis through the geometric center thereof, and a reflector positioned between said object and a central inner portion of said mirror formed with a reflective surface diagonal to said optic axis and obliquely facing said object so as to intercept a central inner bundle of the light rays traveling from said object toward said mirror and to reflect such intercepted rays laterally out of the system prior to reaching said mirror, said diagonal reflective face being of a size to intercept only a central bundle of light rays which would otherwise strike a central inner area of said mirror substantially at least as great as that of the object, said reflector having an outline geometrically similar to and aligned with said image area.

7. In a projection system for projecting an image of a rectangular image area onto a projection screen, the combination of a concave mirror comprising a reflective surface of revolution positioned to face said image area and arranged with its optic axis through the geometric center thereof, and a reflector positioned between said object and a central inner portion of said mirror formed with a reflective surface diagonal to said optic axis and obliquely facing said object so as to intercept a central inner bundle of the light rays traveling from said object toward said mirror and to reflect such intercepted rays laterally out of the system prior to reaching said mirror, said diagonal reflective face being of a size to intercept only a central bundle of light rays which would otherwise strike a central inner area of said mirror substantially at least as great as that of the object, said reflector having a rectangular outline, geometrically similar to said image area and aligned therewith.

8. In a projection system for projecting an image of an object onto a screen, the combination of a concave mirror comprising a reflective surface of revolution positioned to face said object, and a reflector positioned between said object and a central inner portion of said mirror with its reflective surface obliquely facing said object so as to intercept a central inner bundle of the light rays traveling from said object in the direction of said mirror and having a diagonal orientation relative to the optic axis of the mirror so arranged as to reflect such intercepted rays laterally out of the system.

9. In a projection system for projecting an image of an object onto a screen, the combination of a concave mirror comprising a reflective surface of revolution positioned to face said object, and a reflector positioned between said object and a central inner portion of said mirror with its reflective surface obliquely facing said object so as to intercept a central inner bundle of the light rays traveling from said object in the direction of said mirror and having a diagonal orientation relative to the optic axis of the mirror so arranged as to reflect such intercepted rays laterally out of the system, said reflector being of a size to intercept only a central bundle of light rays which would otherwise strike a central inner area of said mirror substantially at least as great as that of the object.

WILLIAM C. MILLER.

REFERENCES CITED

The following references are of record in the file of this patent:

UNITED STATES PATENTS

| Number | Name | Date |
|---|---|---|
| 620,978 | Schupmann | Mar. 14, 1899 |
| 1,668,015 | Harris | May 1, 1928 |
| 1,967,215 | Acht | July 24, 1934 |
| 2,008,793 | Nichols | July 23, 1935 |
| 2,021,533 | Wolfe | Nov. 19, 1935 |
| 2,089,703 | May | Aug. 10, 1937 |
| 2,166,102 | Wild | July 18, 1939 |
| 2,229,302 | Martin | Jan. 21, 1941 |
| 2,234,227 | Below et al. | Mar. 11, 1941 |
| 2,273,801 | Landis | Feb. 17, 1942 |
| 2,295,779 | Epstein | Sept. 15, 1942 |
| 2,309,788 | Ramberg | Feb. 2, 1943 |
| 2,313,204 | Morelle | Mar. 9, 1943 |
| 2,341,410 | Mihalyi | Feb. 8, 1944 |
| 2,358,316 | Chwalow | Sept. 19, 1944 |

FOREIGN PATENTS

| Number | Country | Date |
|---|---|---|
| 375,820 | Great Britain | June 30, 1932 |